(12) United States Patent
Guo et al.

(10) Patent No.: US 9,644,109 B2
(45) Date of Patent: May 9, 2017

(54) SEALANT COMPOSITION, METHOD FOR PREVENTING LIQUID CRYSTAL CONTAMINATION, LIQUID CRYSTAL PANEL AND DISPLAY DEVICE

(71) Applicant: BEIJING BOE OPTOELECTRONICS TECHNOLOGY CO., LTD., Beijing (CN)

(72) Inventors: Renwei Guo, Beijing (CN); Dong Chen, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 417 days.

(21) Appl. No.: 13/995,318

(22) PCT Filed: Dec. 21, 2012

(86) PCT No.: PCT/CN2012/087102
§ 371 (c)(1),
(2) Date: Jun. 18, 2013

(87) PCT Pub. No.: WO2013/139157
PCT Pub. Date: Sep. 26, 2013

(65) Prior Publication Data
US 2014/0065325 A1    Mar. 6, 2014

(30) Foreign Application Priority Data
Mar. 21, 2012  (CN) .......................... 2012 1 0076620

(51) Int. Cl.
*C09D 133/14*    (2006.01)
*C09J 133/06*    (2006.01)
(Continued)

(52) U.S. Cl.
CPC ........ *C09D 133/14* (2013.01); *C09J 133/062* (2013.01); *C09K 3/10* (2013.01);
(Continued)

(58) Field of Classification Search
CPC ...... C09D 133/14; C09D 4/06; C09J 133/062; C09J 4/06; G02F 1/1339; C09K 3/10;
(Continued)

(56) References Cited

U.S. PATENT DOCUMENTS 5,889,125 A * 3/1999 Neumann ............... C08L 63/00
525/504
2004/0131826 A1   7/2004 Chisholm et al.
(Continued)

FOREIGN PATENT DOCUMENTS

CN        1566244 A      1/2005
CN        1682149 A     10/2005
(Continued)

OTHER PUBLICATIONS

Jinbao Guo, et al; "Broadband reflection in polymer stabilized cholesteric liquid crystal cells with chiral monomers derived from cholesterol", Polymers for Advanced Technologies, vol. 19, pp. 1504-1512, Published online May 7, 2008 in Wiley InterScience (www.interscience.wiley.com); DOI: 10.1002/pat.1155.
(Continued)

*Primary Examiner* — Eli D Strah
(74) *Attorney, Agent, or Firm* — Ladas & Parry LLP (57) ABSTRACT

Disclosed is a sealant composition, a liquid crystal device and a method for preventing liquid crystal contamination using the sealant composition. The sealant composition consists of 20-30 parts by weight of an ultraviolet polymerizable double bond monomer, 15-20 parts by weight of a heat polymerization monomer, 5-20 parts by weight of a polymerizable oligomer, 0.1-5 parts by weight of a photoini-
(Continued)

tiator, 10-20 parts by weight of a heat curing agent and 0-20 parts by weight of a particulate additive, wherein said polymerizable oligomer is poly(ethylene glycol) diacrylate or derivatives thereof. Through the reaction between the polymerizable oligomers and the polymer of the ultraviolet polymerizable double bond monomers to generate a reticular high molecular polymer, the anchoring effect of the polymer on the surrounding unreacted heat polymerization monomers is effectively enhanced, thereby reducing the contamination of the crystal liquid by the sealant.

12 Claims, 3 Drawing Sheets (51) Int. Cl.
    *C09K 3/10* (2006.01)
    *G02F 1/1339* (2006.01)
    *C08F 220/18* (2006.01)
    *C08F 222/10* (2006.01)
    *C09J 4/06* (2006.01)

(52) U.S. Cl.
    CPC ...... *G02F 1/1339* (2013.01); *B32B 2457/202* (2013.01); *C08F 220/18* (2013.01); *C08F 222/1006* (2013.01); *C09J 4/06* (2013.01); *C09K 2003/1062* (2013.01); *C09K 2200/0625* (2013.01); *Y10T 428/1059* (2015.01); *Y10T 428/1082* (2015.01)

(58) Field of Classification Search
    CPC .... C09K 2200/0625; C09K 2003/1062; B32B 2457/202; Y10T 428/1059; Y10T 428/1082; C08F 222/1006; C08F 220/18
    See application file for complete search history.

(56) References Cited

U.S. PATENT DOCUMENTS

| | | | |
|---|---|---|---|
| 2004/0258921 A1 | 12/2004 | Watanabe et al. | |
| 2006/0009579 A1* | 1/2006 | Miyawaki | C08F 283/10 525/31 |
| 2009/0093562 A1* | 4/2009 | Tanikawa | C08F 290/06 522/44 |
| 2009/0173438 A1* | 7/2009 | Takeuchi | C07C 323/22 156/275.5 |
| 2010/0163177 A1 | 7/2010 | Schmitt et al. | |

FOREIGN PATENT DOCUMENTS

| | | |
|---|---|---|
| CN | 101343527 A | 1/2009 |
| CN | 101564551 A | 10/2009 |
| CN | 101838505 A | 9/2010 |
| CN | 102321233 A | 1/2012 |
| CN | 12702987 A | 10/2012 |
| JP | 6116257 A | 7/1986 |
| JP | 62-129376 A | 6/1987 |
| JP | 2004-265568 A | 9/2004 |
| JP | 2004-339341 A | 12/2004 |
| JP | 3597597 B2 | 12/2004 |
| JP | 2008-507617 A | 3/2008 |

OTHER PUBLICATIONS

Jinbao Guo, et al; "Reflectance properties of polymer-stabilised cholesteric liquid crystals cells with cholesteryl compounds of different functionality", Liquid Crystals, vol. 35, No. 1, Jan. 2008, pp. 87-97.
Renwei Guo, et al; "Bandwidth-controllable reflective cholesteric gels from photo-and thermally-induced processes", Liquid Crystals, vol. 37, No. 3, Mary 2010, pp. 311-316.
International Search Report mailed Mar. 28, 2013; PCT/CN2012/087102.
First Chinese Office Action dated Jan. 13, 2014; Appln. No. 201210076620.4.
Korean Office Action Appln. No. 10-2013-7019186; Dated Jan. 30, 2015.
Korean Examination Opinion dated Jul. 30, 2014; Appln. No. 10-2013-7019186.
Second Chinese Office Action dated Aug. 15, 2014; Appln. No. 201210076620.4.
International Preliminary Report on Patentability dated Sep. 23, 2014; PCT/CN2012/087102.
Extended European Search Report Appln. No. 12852440.2-1357 / 2829584 PCT/CN2012087102; Dated Sep. 28, 2015.
Japanese Office Action dated Nov. 28, 2016; Appln. No. 2015-500747.
EPO Communication dated Jan. 9, 2017; Appln. 12 852 440.2-1375.

* cited by examiner

SEALANT COMPOSITION, METHOD FOR PREVENTING LIQUID CRYSTAL CONTAMINATION, LIQUID CRYSTAL PANEL AND DISPLAY DEVICE

TECHNICAL FIELD

Embodiments of the present invention relate to design of a sealant in a liquid crystal display, a liquid crystal display device, and a method for preventing the liquid crystal contamination using the sealant, as well as to the use of the sealant.

BACKGROUND

During the manufacture of a liquid crystal panel, after the alignment of the colored film (CF) substrate and the array substrate, liquid crystal is filled between the colored film substrate and the array substrate, and the peripheries are sealed with glue, namely the sealant. Commonly used sealants primarily comprise an ultraviolet polymerizable double bond monomer, a thermal polymerization monomer, a photoinitiator, a heat curing agent, and a particulate additive, etc.

Commonly used sealants are cross-linked by stepwise polymerization. First, ultraviolet polymerization is conducted, which generates free radicals from the photoinitiator by ultraviolet irradiation. The free radicals initiate the chain polymerization of the ultraviolet polymerizable double bond monomer to generate a high molecular polymer. During this process, since the rate of the polymerization of the heat polymerization monomer is slow, and the rate of the polymerization of the ultraviolet polymerizable double bond monomer is fast, the high molecular polymer generated by the polymerization of the ultraviolet polymerizable double bond monomer can thus anchor the heat polymerization monomer in the sealant, blocking the diffusion of the heat polymerization monomer into the liquid crystal, preventing the contamination of the liquid crystal by the sealant, thereby avoiding the appearance such as yellowing and unevenness in the peripheries of the liquid crystal panel. After the completion of the ultraviolet polymerization, the heat polymerization is conducted, during which the heat polymerization monomers are polymerized to generate a high molecular polymer with good mechanical performance, thereby effectively binding the colored film substrate and the array substrate.

Studies on anchoring surrounding small molecular by polymer network are introduced in the following publications:

[1] Guo J B, Sun J, Zhang L P, Li K X, Cao H, Yang H, Zhu S Q, Polym Advan Technol, 2008: 19: 1504-1512.

[2] Guo J B, Sun J, Li K X, Cao H, Yang H. Liq Cryst, 2008: 35: 87-97.

[3] Guo R W, Cao H, Yang C Y, Wu X J, Meng Q Y, Liu T, He W L, Cheng Z H, Yang H. Liq Cryst, 2010: 37: 311-316.

Currently, the high molecular polymers generated by photoinitiators from ultraviolet polymerizable double bond monomers during the ultraviolet polymerization of the existing sealant are mostly linear, which cannot effectively anchor heat polymerization monomers, so that there are still a portion of heat polymerization monomers diffusing into and thus contaminating the liquid crystal.

SUMMARY

In view of this, the primary purpose of the invention is to provide a sealant composition, and a method, a liquid crystal panel and a display device for preventing liquid crystal contamination using the sealant composition by generating a reticular high molecular polymer during an ultraviolet polymerization of the polymerizable oligomers and the polymer of the ultraviolet polymerizable double bond monomers in the sealant to enhance the anchoring effect of the polymer on the surrounding unreacted heat polymerization monomers, and thereby reducing the contamination of the crystal liquid by the sealant.

In order to achieve the aforementioned purpose, one aspect of the invention provides a sealant composition which comprises an ultraviolet polymerizable double bond monomer and a polymerizable oligomer, wherein said polymerizable oligomer is preferably poly(ethylene glycol) diacrylate or derivatives thereof. More preferably, the ultraviolet polymerizable double bond monomer is an acrylate, preferably methyl acrylate, methyl methacrylate, ethyl acrylate, propyl acrylate, or butyl acrylate.

Another aspect of the invention provides a sealant composition comprising or consisting of:
an ultraviolet polymerizable double bond monomer, 20-30 parts by weight;
a heat polymerization monomer, 15-20 parts by weight;
a polymerizable oligomer, 5-20 parts by weight;
a photoinitiator, 0.1-5 parts by weight;
a heat curing agent, 10-20 parts by weight; and
a particulate additive, 0-20 parts by weight;
wherein said polymerizable oligomer is poly(ethylene glycol) diacrylate or derivatives thereof.

Furthermore, said poly(ethylene glycol) diacrylate or derivatives thereof has a weight-average molecular weight of 200-3000.

Furthermore, said poly(ethylene glycol) diacrylate or derivatives thereof has a weight-average molecular weight of 200-1000.

Furthermore, said ultraviolet polymerizable double bond monomer is methyl acrylate, methyl methacrylate, ethyl acrylate, propyl acrylate or butyl acrylate;
said heat polymerization monomer is a heat polymerizable monomer with epoxy group;
said photoinitiator is dibenzoyl peroxide, lauroyl peroxide, azobisisobutyronitrile, azobisisoheptonitrile, diisopropyl peroxydicarbonate or dicyclohexyl peroxydicarbonate;
said heat curing agent is an amino curing agent; and said particulate additive is a silicon dioxide particle.

Furthermore, said heat polymerizable monomer with epoxy group is ethylene glycol diglycidyl ether;
said amino curing agent is 1,8-diamino-3,6-dioxaoctane.

The invention further provides a method for preventing liquid crystal contamination using a sealant composition comprising the steps of:

a) mixing the aforementioned sealant composition and subjecting it to defoaming under protection from light;

b) coating the mixture obtained in step a) onto a colored film substrate and/or an array substrate, and then filling the colored film substrate and the array substrate with the liquid crystal and aligning them to obtain the liquid crystal display panel;

c) irradiating the liquid crystal display panel with ultraviolet light so that the polymerizable oligomer and the polymer of the ultraviolet polymerizable double bond monomer in the sealant are polymerizated; and d) heating the liquid crystal display panel obtained in step c) so that the heat polymerization monomer in the sealant is polymerized.

Furthermore, in said step a), the defoaming under protection from light lasts 1-5 hours.

Furthermore, in said step c), the wavelength of the ultraviolet light is 350-380 nm, the duration of the ultraviolet light irradiation is 1-60 mins, and the intensity of the ultraviolet light irradiation is 0.1-100 mW/cm$^2$.

Furthermore, in said step d), the temperature of the heat polymerization is 50-150° C., and the reaction duration is 0.5-5 hours.

The invention further provides a liquid crystal panel which employs the aforementioned sealant composition for sealing.

The invention further provides a display device which comprises the aforementioned liquid crystal panel.

The invention also provides use of the aforementioned sealant composition for preventing liquid crystal contamination.

Compared to the prior art, the sealant of the invention features the following advantages: (A) the sealant of the invention comprises a polymerizable oligomer which is linear itself and can first generates a reticular high molecular polymer with the polymer of the ultraviolet polymerizable double bond monomer during the ultraviolet light polymerization, and compared to the linear high molecular polymers generated during the ultraviolet polymerization of the sealants of the prior art, the reticular high molecular polymer of the invention further favors the strengthening of the anchoring effect of the polymer on the surrounding unreacted heat polymerization monomers, and effectively reduces the contamination of the liquid crystal by the sealant; (B) the polymerizable oligomer in the sealant of the invention is a polymer itself with a large molecule and linear molecular structure, as well as a high viscosity, which can anchor the heat polymerization monomer, the ultraviolet polymerizable double bond monomer and other small molecules in the sealant to some extent before the polymerization occurs, further reducing the diffusion of the heat polymerization monomer, the ultraviolet polymerizable double bond monomer and other small molecules into the liquid crystal, thereby further reducing the contamination of the liquid crystal by the sealant and preventing the appearance such as yellowing and unevenness from occurring in the peripheries of the liquid crystal panel.

BRIEF DESCRIPTION OF THE DRAWINGS

In order to further illustrate the technical solution of the embodiments of the invention, the figures of the embodiments are briefly introduced below. Apparently, the figures in the following description merely concern some embodiments of the invention, rather than limiting the invention.

REFERENCE FOR THE NUMBERS/SYMBOLS IN THE DRAWING

1 liquid crystal
2 unpolymerized monomer
3 sealant
4 periphery of the glass substrate
5 polymerizable oligomer
12 photoinitiator
121, 122 free radicals
13 polymer of ultraviolet polymerizable double bond monomer
14 high molecular polymer

DETAILED DESCRIPTION

In order to make the object, technical solutions and advantages of the embodiments of the invention more clear, the technical solutions of the embodiments of the present invention are clearly and completely described below in relation to the figures of the embodiments of the present invention. Apparently, the embodiments described are merely some, rather than all embodiments of the present invention. Based on the embodiments of the invention described, any other embodiments obtained by a person of ordinary skill in the art without resorting to creative labor are within the scope of the present invention.

The essential concept of the invention is to further add a polymerizable oligomer in addition to the components of the existing liquid crystal display sealant so that the polymerizable oligomer first generates a reticular high molecular polymer with the ultraviolet polymerizable double bond monomer during the ultraviolet light polymerization, and the reticular structure of the reticular high molecular polymer is utilized to effectively anchor the surrounding heat polymerization monomers, thereby reducing the contamination of the liquid crystal by the sealant, and meanwhile because the polymerizable oligomer is an oligomer itself, to some extent it can anchor the surrounding unreacted monomers before the polymerization, and thus further reduce the contamination of the liquid crystal by the sealant.

In one embodiment, the sealant composition of the invention comprises an ultraviolet polymerizable double bond monomer and a polymerizable oligomer, wherein said polymerizable oligomer is preferably a poly(ethylene glycol) diacrylate or derivatives thereof. More preferably, the ultraviolet polymerizable double bond monomer can be an acrylate, more preferably methyl acrylate, methyl methacrylate, ethyl acrylate, propyl acrylate, or butyl acrylate.

The ultraviolet polymerizable double bond monomer generally refers to a group of compounds which contain a double bond and can polymerize under the conditions of initiation by a photoinitiator.

In one embodiment, the sealant composition of the invention comprises or consists of an ultraviolet polymerizable double bond monomer, 20-30 parts by weight;
a heat polymerization monomer, 15-20 parts by weight;
a polymerizable oligomer, 5-20 parts by weight;
a photoinitiator, 0.1-5 parts by weight;

a heat curing agent, 10-20 parts by weight; and
a particulate additive, 0-20 parts by weight;
wherein said polymerizable oligomer is preferably poly (ethylene glycol) diacrylate or derivatives thereof, said poly(ethylene glycol) diacrylate (PEGDA) and derivatives thereof may contain 2-4 C=C double bonds (the C=C double bond concerned in the invention refers to the C=C double bonds in the backbone of poly(ethylene glycol) diacrylate), preferably contain 2 C'C double bonds; its weight-average molecular weight can be 200-3000, preferably 200-1000, for example, the weight-average molecular weight is 200 (PEGDA 200), 400 (PEGDA 400), 600 (PEGDA 600) or 1000 (PEGDA 1000).

In the invention, unless stated otherwise, the molecular weight usually refers to the weight-average molecular weight.

The ultraviolet polymerizable double bond monomer in the sealant composition of the invention can be an acrylate, preferably methyl acrylate, methyl methacrylate, ethyl acrylate, propyl acrylate or butyl acrylate; said heat polymerization monomer is preferably heat polymerizable monomer with epoxy group, in particular can preferably be ethylene glycol diglycidyl ether; said photoinitiator is preferably dibenzoyl peroxide, lauroyl peroxide, azobisisobutyronitrile, azobisisoheptonitrile, diisopropyl peroxydicarbonate or dicyclohexyl peroxydicarbonate, etc.; said heat curing agent is preferably an amino curing agent, in particular it is preferably 1,8-diamino-3,6-dioxaoctane, etc.; said particulate additive can be a silicon dioxide particle, etc.

Figure 1:
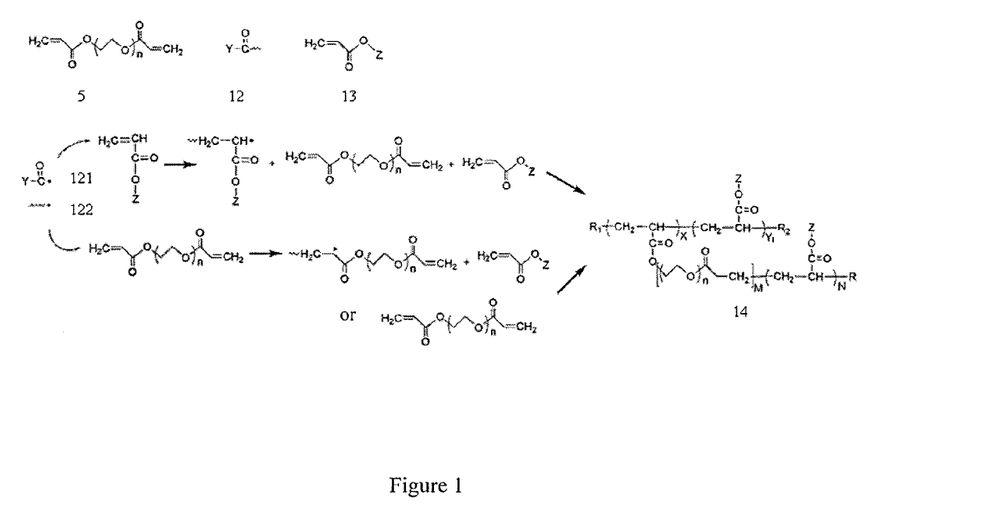
FIG. 1 is a schematic diagram of the mechanism of the reaction between the components of the sealant of the invention.

FIG. 1 is a schematic diagram of the mechanism of the reaction between the components of the sealant of the invention. The polymerizable oligomer (poly(ethylene glycol) diacrylate) 5 of the sealant of the invention has two C=C double bonds which can react with the polymer of the ultraviolet polymerizable double bond monomer (in FIG. 1, the polymer of the ultraviolet polymerizable double bond monomer is shown as poly(methyl acrylate); in order to favor the description of the reaction, only 1 unit of the poly(methyl acrylate) is shown in the figure) during the ultraviolet polymerization to generate the high molecular reticular polymer. As shown in FIG. 1 (in the figure, Y and Z represents carbon chain derivatives, and X, $Y_1$, M, N and n all represents the number of the repeating units), the specific reaction route is as follows: the photoinitiator 12 is activated by the ultraviolet to generate the free radicals 121 and 122; after initiated by the free radicals, the polymer 13 of the ultraviolet polymerizable double bond monomer reacts with the polymerizable oligomer and uninitiated polymer of the ultraviolet polymerizable double bond monomer to generate the reticular high molecular polymer 14; alternatively, the polymerizable oligomer can also react with the polymer of the ultraviolet polymerizable double bond monomer after the free radical initiation, or the polymerizable oligomer, after the free radical initiation, can react with the polymer of the ultraviolet polymerizable double bond monomer and uninitiated polymerizable oligomer to generate the reticular high molecular polymer 14.

Figure 2:
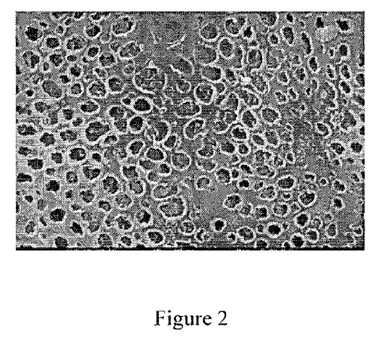
FIG. 2 is an SEM photo of the reticular high molecular polymer generated by the reaction between the polymerizable oligomer and the polymer of the ultraviolet polymerizable double bond monomer in the sealant of the invention.

FIG. 2 is a scanning electric microscope (SEM, Leicas 440) photo (WD-27 mm, with 5000× magnification) of the reticular high molecular polymer generated by the reaction between the polymerizable oligomer and the polymer of the ultraviolet polymerizable double bond monomer in the sealant of the invention. From FIG. 2, it can be seen that the reticular high molecular polymer has a reticular structure, which has good anchoring effect on small molecular substances and can effectively prevent unreacted heat polymerization monomer from diffusion into the liquid crystal, thereby reducing the contamination of the liquid crystal by the sealant.

Figure 3:
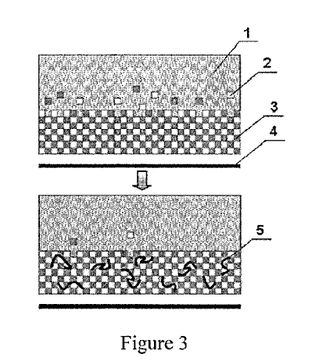
FIG. 3 is a schematic diagram of the diffusion of the unreacted monomers into the liquid crystal before and after the addition of the polymerizable oligomer into the sealant of the invention.

Moreover, since the polymerizable oligomer in the sealant of the invention is a polymer, it has a high molecular weight, for example, the molecular weight of PEGDA 1000 is 1000. It has a linear molecular structure and high viscosity, so it can anchor the small molecules in the sealant before the polymerization, which favors further reduction of the diffusion of the unreacted ultraviolet polymerizable monomer, the heat polymerization monomer or other small molecules into the liquid crystal during the polymerization. As shown in FIG. 3, before the addition of the polymerizable oligomer, since the unpolymerized monomer 2 (including the unreacted ultraviolet polymerizable monomer and the heat polymerization monomer or other small molecules, mainly the heat polymerization monomer) in the sealant 3 is a small molecule, which is prone to diffusion into the liquid crystal 1 and causing the contamination of the liquid crystal close to the periphery 4 of the glass substrate. Alternatively, after adding the polymerizable oligomer in the sealant, since the polymerizable oligomer is a polymer, has a high molecular weight (for example, the molecular weight of PEGDA is 1000), has a linear molecular structure, and has a high viscosity, it can anchor the small molecules in the sealant before the polymerization, and further favors the reduction of the diffusion of the small molecular substances in the sealant into the liquid crystal during the polymerization, thereby reducing the contamination of the liquid crystal by the sealant.

The content of the polymerizable oligomer in the sealant of the invention will affect the effect of the control of the liquid crystal contamination. When the content of the polymerizable oligomer is relatively low, the high molecular network generated after the ultraviolet polymerization is relatively loose, and the anchoring effect on the small molecular is relatively weak; and when the content of the polymerizable oligomer is relative high, the high molecular network generated after the ultraviolet polymerization is relatively dense, and the anchoring effect on the small molecular in the sealant is relatively strong so that the small molecular substances is not easier to diffuse into the liquid crystal, thereby further favoring the reduction of the contamination of the liquid crystal by the sealant. However, when the content of the polymerizable oligomer increases, the contents of other substances in the sealant (such as the heat polymerization monomer, heat curing agent) will decrease, so that the binding force of the sealant against the upper and lower substrates (the array substrate and the CF substrate) is weakened, thereby affecting the performance of the liquid crystal panel. Therefore, only when the content of the polymerizable oligomer in the sealant is maintained at a proper level does it favor the reduction of the contamination of the liquid crystal by the sealant while not affecting the performance of the liquid crystal panel. The content of the polymerizable oligomer in the sealant of the invention is the optimal range of content determined on the basis of considering all kinds of factors.

Furthermore, the molecular weight of the polymerizable oligomer will also affect the effect of the control of the liquid crystal contamination. When the content of the polymerizable oligomer and the number of double bonds remain constant, the lower the molecular weight of the polymerizable oligomer, the increase of its mole number causing the increase of the mole number of the double bond functionality contained accordingly, the more easier for the polymerization reaction to occur during the polymerization to generate the high molecular network, thereby more favoring the anchoring of the surrounding small molecular substances. However, low molecular polymerizable oligomer is prone to thoroughly agitation with other small molecular compounds during the mixing, thereby causing the reduction of the anchoring effect of the polymerizable oligomer itself on the surrounding small molecular substances. Moreover, when the molecular weight of the polymerizable oligomer is high, its low mole number causing the reduction of the mole number of the double bond functionality contained accordingly, it is much less easier for the polymerization reaction to occur during the polymerization to generate the high molecular network, thereby disfavoring the anchoring of the surrounding small molecular substances. However, because the chain of the high molecular weight polymerizable oligomer molecule is longer, the anchoring effect of itself on the surrounding small molecular substances is enhanced, thereby favoring the prevention of the surrounding small molecular substances from diffusion into the liquid crystal. Therefore, in practice, a polymerizable oligomer of a suitable molecular weight needs to be selected so as to achieve the effect of good control of the liquid crystal contamination. It is preferred in the invention that the polymerizable oligomer has a weight-average molecular weight of 200-3000, more preferably 200-1000.

Figure 4:
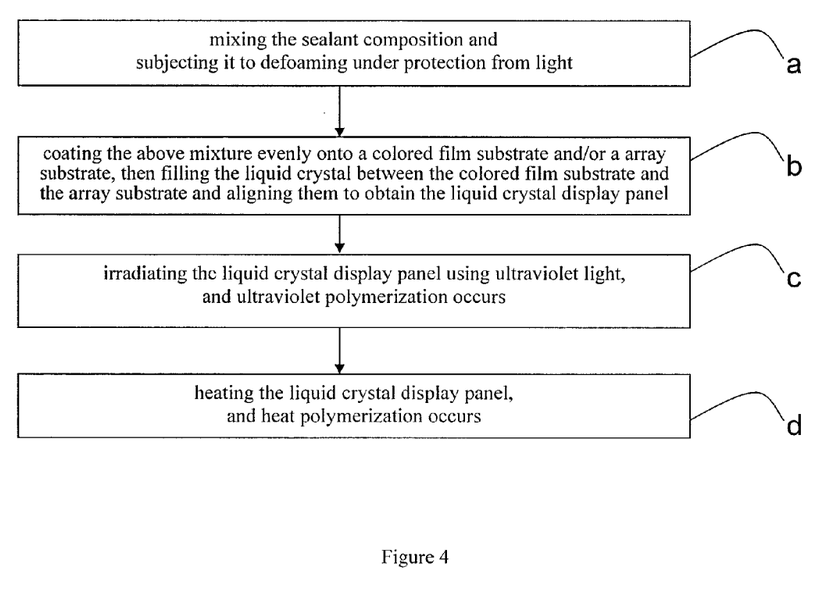
FIG. 4 is the flow chart of the method for preventing the liquid crystal contamination using the sealant of the invention.

In one embodiment, the invention further provides a method for preventing the liquid crystal contamination using the aforementioned sealant composition, which, for example, primarily comprises the following steps as shown in FIG. 4:
a) mixing the aforementioned sealant composition and subjecting it to defoaming under protection from light for 1-5 hours;
b) coating the mixture obtained in step a) evenly onto a colored film substrate and/or an array substrate, and then filling the colored film substrate and the array substrate with the liquid crystal and aligning them to obtain the liquid crystal display panel;
c) irradiating the liquid crystal display panel with ultraviolet light so that ultraviolet polymerizable double bond monomers are polymerized to generate the polymer after ultraviolet light irradiation, and then the polymerizable oligomer and the polymer of the ultraviolet polymerizable double bond monomer in the sealant are polymerized, wherein the wavelength of the ultraviolet light is 350-380 nm, the ultraviolet light irradiation time is 1-60 mins, and the ultraviolet light irradiation intensity is 0.1-100 mW/cm$^2$; and
d) heating the liquid crystal display panel obtained in step c) so that the heat polymerization monomers in the sealant are polymerized, wherein the temperature of the heat polymerization is 50-150° C., and the reaction time is 0.5-5 hours.

The various components in the sealant composition used in this method are the same as those in the aforementioned sealant composition of the invention and will not be repeated here.

The invention further provides a liquid crystal panel, which employs the sealant composition of the invention for sealing.

The invention further provides a display device comprising the liquid crystal panel, which employs the sealant composition of the invention for sealing.

The invention further provides use of the sealant composition of the invention for preventing liquid crystal contamination.

Below are the specific examples of the sealant of the invention and the prevention of liquid crystal contamination using the sealant (all chemicals used in the examples of the invention can be obtained commercially, for example obtained by purchase from Aldrich Co.).

A. The Method for Preparing the Sealant and Preventing Liquid Crystal Contamination Example 1

The Preparation of the Sealant 1 and the Prevention of Liquid Crystal Contamination Using the Sealant 1 a) 20 parts by weight of the ultraviolet polymerizable double bond monomer (ethyl acrylate), 15 parts by weight of the heat polymerization monomer (ethylene glycol diglycidyl ether), 7 parts by weight of the polymerizable oligomer (poly(ethylene glycol) diacrylate, containing 2 C=C double bonds, with a weight-average molecular weight of 2500), 0.1 parts by weight of the photoinitiator (dibenzoyl peroxide) and 10 parts by weight of the heat curing agent (1,8-diamino-3,6-dioxaoctane) are mixed to obtain a uniform mixture, which is placed into a defoamer for a defoaming under protection from light for 1 hour;
b) the mixture obtained in step a) is uniformly coated onto a colored film substrate, and the liquid crystal is filled to the colored film substrate and the array substrate which are aligned to obtain the liquid crystal display panel;
c) the liquid crystal display panel is irradiated with ultraviolet light which has a wave length of 350 nm, the ultraviolet light irradiation time being 1 min and the ultraviolet irradiation intensity being 100 mW/cm$^2$; and
d) the liquid crystal display panel obtained in step c) is heated so that the heat polymerization monomers in the sealant are polymerized at a temperature of 50° C. for a reaction duration of 5 hours.

Example 2 the preparation of the sealant 2 and the prevention of liquid crystal contamination using the sealant 2
a) 21 parts by weight of the ultraviolet polymerizable double bond monomer (methyl acrylate), 16.5 parts by weight of the heat polymerization monomer (ethylene glycol diglycidyl ether), 5 parts by weight of the polymerizable oligomer (poly(ethylene glycol) diacrylate, containing 2 C=C double bonds, with a weight-average molecular weight of 3000), 0.5 parts by weight of the photoinitiator (lauroyl peroxide), 12 parts by weight of the heat curing agent (1,8-diamino-3,6-dioxaoctane), and 2 parts by weight of the particulate additive (silicon dioxide) are mixed to obtain a uniform mixture, which is placed into a defoamer for a defoaming under protection from light for 1.5 hours;
b) the mixture obtained in step a) is uniformly coated onto a colored film substrate, and the liquid crystal is filled to the colored film substrate and the array substrate which are aligned to obtain the liquid crystal display panel;
c) the liquid crystal display panel is irradiated with ultraviolet light which has a wave length of 370 nm, the ultraviolet light irradiation time being 5 mins and the ultraviolet irradiation intensity being 95 mW/cm$^2$; and
d) the liquid crystal display panel obtained in step c) is heated so that the heat polymerization monomer in the sealant are polymerized at a temperature of 60° C. for a reaction duration of 4.5 hours.

Example 3

The Preparation of the Sealant 3 and the Prevention of Liquid Crystal Contamination Using the Sealant 3 a) 23 parts by weight of the ultraviolet polymerizable double bond monomer (methyl methacrylate), 15 parts by weight of the heat polymerization monomer (ethylene glycol diglycidyl ether), 10 parts by weight of the polymerizable oligomer (poly(ethylene glycol) diacrylate, containing 2 C=C double bonds, with a weight-average molecular weight of 2000), 1 parts by weight of the photoinitiator (azobisisobutyronitrile), 13 parts by weight of the heat curing agent (1,8-diamino-3,6-dioxaoctane), and 5 parts by weight of the particulate additive (silicon dioxide) are mixed to obtain a uniform mixture, which is placed into a defoamer for a defoaming under protection from light for 2 hours;

b) the mixture obtained in step a) is uniformly coated onto an array substrate, and the liquid crystal is filled to the colored film substrate and the array substrate which are aligned to obtain the liquid crystal display panel;

c) the liquid crystal display panel is irradiated with ultraviolet light which has a wave length of 375 nm, the ultraviolet light irradiation time being 10 mins and the ultraviolet irradiation intensity being 80 mW/cm$^2$; and d) the liquid crystal display panel obtained in step c) is heated so that the heat polymerization monomers in the sealant are polymerized at a temperature of 75° C. for a reaction duration of 3 hours.

Example 4

The Preparation of the Sealant 4 and the Prevention of Liquid Crystal Contamination Using the Sealant 4 a) 22 parts by weight of the ultraviolet polymerizable double bond monomer (propyl acrylate), 17 parts by weight of the heat polymerization monomer (ethylene glycol diglycidyl ether), 12 parts by weight of the polymerizable oligomer (poly(ethylene glycol) diacrylate, containing 2 C=C double bonds, with a weight-average molecular weight of 1500), 1.5 parts by weight of the photoinitiator (azobisisoheptonitrile), 15 parts by weight of the heat curing agent (1,8-diamino-3,6-dioxaoctane) and 7 parts by weight of the particulate additive (silicon dioxide) are mixed to obtain a uniform mixture, which is placed into a defoamer for a defoaming under protection from light for 3 hours;

b) the mixture obtained in step a) is uniformly coated onto an array substrate, and the liquid crystal is filled to the colored film substrate and the array substrate which are aligned to obtain the liquid crystal display panel;

c) the liquid crystal display panel is irradiated with ultraviolet light which has a wave length of 365 nm, the ultraviolet light irradiation time being 40 mins and the ultraviolet irradiation intensity being 35 mW/cm$^2$; and d) the liquid crystal display panel obtained in step c) is heated so that the heat polymerization monomers in the sealant are polymerized at a temperature of 90° C. for a reaction duration of 2.7 hours.

Example 5

The Preparation of the Sealant 5 and the Prevention of Liquid Crystal Contamination Using the Sealant 5 a) 25 parts by weight of the ultraviolet polymerizable double bond monomer (propyl acrylate), 17.5 parts by weight of the heat polymerization monomer (ethylene glycol diglycidyl ether), 15 parts by weight of the polymerizable oligomer (poly(ethylene glycol) diacrylate, containing 2 C=C double bonds, with a weight-average molecular weight of 1000), 2 parts by weight of the photoinitiator (diisopropyl peroxydicarbonate). 17 parts by weight of the heat curing agent (1,8-diamino-3,6-dioxaoctane) and 10 parts by weight of the particulate additive (silicon dioxide) are mixed to obtain a uniform mixture, which is placed into a defoamer for a defoaming under protection from light for 3.5 hours;

b) the mixture obtained in step a) is uniformly coated onto a colored film substrate, and the liquid crystal is filled to the colored film substrate and the array substrate which are aligned to obtain the liquid crystal display panel;

c) the liquid crystal display panel is irradiated with ultraviolet light which has a wave length of 360 nm, the ultraviolet light irradiation time being 50 mins and the ultraviolet irradiation intensity being 15 mW/cm$^2$; and d) the liquid crystal display panel obtained in step c) is heated so that the heat polymerization monomer in the sealant are polymerized at a temperature of 100° C. for a reaction duration of 2.5 hours.

Example 6

The Preparation of the Sealant 6 and the Prevention of Liquid Crystal Contamination Using the Sealant 6 a) 27 parts by weight of the ultraviolet polymerizable double bond monomer (ethyl acrylate), 19 parts by weight of the heat polymerization monomer (ethylene glycol diglycidyl ether), 17 parts by weight of the polymerizable oligomer (poly(ethylene glycol) diacrylate, containing 2 C=C double bonds, with a weight-average molecular weight of 600). 3 parts by weight of the photoinitiator (dicyclohexyl peroxydicarbonate), 18 parts by weight of the heat curing agent (1,8-dimino-3,6-dioxaoctane) and 15 parts by weight of the particulate additive (silicon dioxide) are mixed to obtain a uniform mixture, which is placed into a defoamer for a defoaming under protection from light for 4 hours;

b) the mixture obtained in step a) is uniformly coated onto a colored film substrate, and the liquid crystal is filled to the colored film substrate and the array substrate which are aligned to obtain the liquid crystal display panel;

c) the liquid crystal display panel is irradiated with ultraviolet light which has a wave length of 365 nm, the ultraviolet light irradiation time being 20 mins and the ultraviolet irradiation intensity being 65 mW/cm$^2$; and d) the liquid crystal display panel obtained in step c) is heated so that the heat polymerization monomer in the sealant are polymerized at a temperature of 110° C. for a reaction duration of 2 hours.

Example 7

The Preparation of the Sealant 7 and the Prevention of Liquid Crystal Contamination Using the Sealant 7 a) 30 parts by weight of the ultraviolet polymerizable double bond monomer (butyl acrylate), 18 parts by weight of the heat polymerization monomer (ethylene glycol diglycidyl ether), 19 parts by weight of the polymerizable oligomer (poly(ethylene glycol) diacrylate, containing 2 C=C double bonds, with a weight-average molecular weight of 400), 4 parts by weight of the photoinitiator (lauroyl peroxide), 19 parts by weight of the heat curing agent (1,8-diamino-3,6-dioxaoctane) and 20 parts by weight of the particulate additive (silicon dioxide) are mixed to obtain a uniform mixture, which is placed into a defoamer for a defoaming under protection from light for 4.5 hours;

b) the mixture obtained in step a) is uniformly coated onto a colored film substrate, and the liquid crystal is filled to the colored film substrate and the array substrate which are aligned to obtain the liquid crystal display panel;

c) the liquid crystal display panel is irradiated with ultraviolet light which has a wave length of 355 nm, the ultraviolet light irradiation time being 60 mins and the ultraviolet irradiation intensity being 0.1 mW/cm$^2$; and d) the liquid crystal display panel obtained in step c) is heated so that the heat polymerization monomer in the sealant are polymerized at a temperature of 130° C. for a reaction duration of 1 hour.

Example 8

The Preparation of the Sealant 8 and the Prevention of Liquid Crystal Contamination Using the Sealant 8 a) 29 parts by weight of the ultraviolet polymerizable double bond monomer (butyl acrylate), 20 parts by weight of the heat polymerization monomer (ethylene glycol diglycidyl ether), 20 parts by weight of the polymerizable oligomer (poly(ethylene glycol) diacrylate, containing 2 C=C double bonds, with a weight-average molecular weight of 200), 5 parts by weight of the photoinitiator (azobisisoheptonitrile), 20 parts by weight of the heat curing agent (1,8-diamino-3,6-dioxaoctane) and 17 parts by weight of the particulate additive (silicon dioxide) are mixed to obtain a uniform mixture, which is placed into a defoamer for a defoaming under protection from light for 5 hours;

b) the mixture obtained in step a) is uniformly coated onto a colored film substrate and the array substrate, and the liquid crystal is filled to the colored film substrate and the array substrate which are aligned to obtain the liquid crystal display panel;

c) the liquid crystal display panel is irradiated with ultraviolet light which has a wave length of 380 nm, the ultraviolet light irradiation time being 30 mins and the ultraviolet irradiation intensity being 50 mW/cm$^2$; and d) the liquid crystal display panel obtained in step c) is heated so that the heat polymerization monomer in the sealant are polymerized at a temperature of 150° C. for a reaction duration of 0.5 hours.

TABLE 1 the contents of various components in the sealant of Examples 1-8 (parts by weight)

| sealant | ultraviolet polymerizable double bond monomer | heat polymerization monomer | polymerizable oligomer | photoinitiator | heat curing agent | particulate additive |
|---|---|---|---|---|---|---|
| sealant 1 | 20 | 15 | 7 | 0.1 | 10 | 0 |
| sealant 2 | 21 | 16.5 | 5 | 0.5 | 12 | 2 |
| sealant 3 | 23 | 15 | 10 | 1 | 13 | 5 |
| sealant 4 | 22 | 17 | 12 | 1.5 | 15 | 7 |
| sealant 5 | 25 | 17.5 | 15 | 2 | 17 | 10 |
| sealant 6 | 27 | 19 | 17 | 3 | 18 | 15 |
| sealant 7 | 30 | 18 | 19 | 4 | 19 | 20 |
| sealant 8 | 29 | 20 | 20 | 5 | 20 | 17 |

B. Comparative Example

In the comparative example, the control sealant has the same composition as that in Example 5 except for the sealant does not comprise the polymerizable oligomer. Moreover, following the same process steps as shown in the aforementioned examples, the control sealant containing no polymerizable oligomer is employed to seal the liquid crystal display panel.

C. Liquid Crystal Contamination Test

A Fourier Transformation Infrared (FT-IR) Spectrometer (Perkin Elmer, room temperature test) is used to test the liquid crystal close to the sealant of the liquid crystal panels in Examples 1, 3, 4, 5, 7 and 8 and the liquid crystal close to the sealant of the liquid crystal panel obtained in the comparative example, in which the characteristic absorption peak intensities at the position of 916 cm$^{-1}$ are compared.

Figure 5:
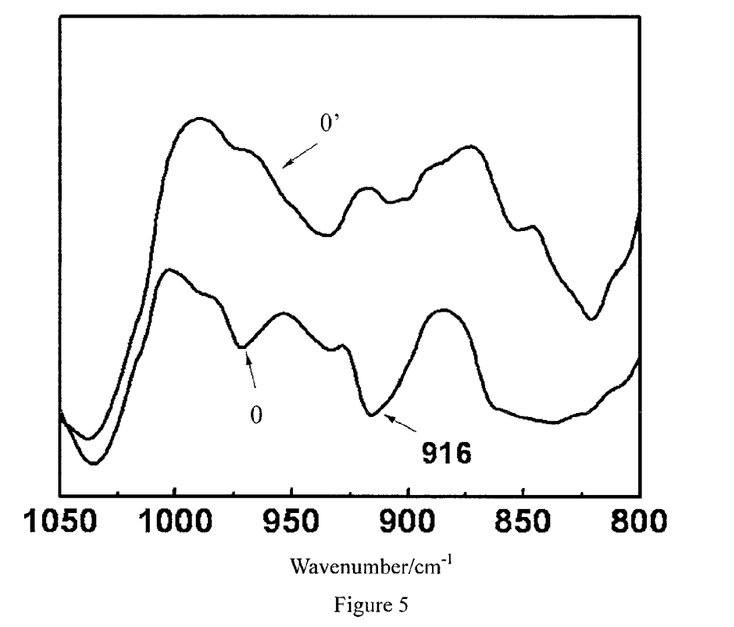
FIG. 5 is the comparative FT-IR spectrum of the contamination of the liquid crystal by the sealants after the application of the sealants with and without the addition of the polymerizable oligomer to the liquid crystal in embodiments of the invention, respectively.
Figure 6:
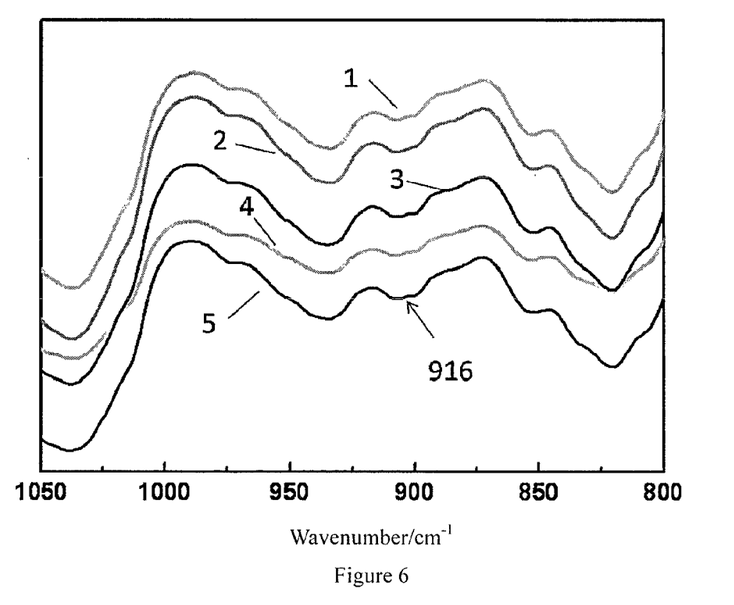
FIG. 6 is the FT-IR spectrum of the contamination of the liquid crystal by the sealant after sealing the liquid crystal display with the sealants with the addition of the polymerizable oligomer in embodiments of the invention.

FIG. 5 shows the comparative FT-IR spectrum of the contamination of the liquid crystal by the sealants after the application of the sealants with the addition of the polymerizable oligomer in Example 5 of the invention (curve 0') and the control sealant without the addition of the polymerizable oligomer (curve 0). From FIG. 5, it can be seen that compared to the liquid crystal panel employing the control frame sealing panel not comprising the polymerizable oligomer, the liquid crystal panel sealed employing the sealant of the invention that comprises the polymerizable oligomer has the liquid crystal with a weak epoxy group characteristic absorption peak intensity of the heat polymerization monomer at 916 cm$^{-1}$, that is, there are few residual heat polymerization monomers in the liquid crystal. FIG. 6 shows the FT-IR spectrum of the contamination of the liquid crystal by the sealant after the application of the sealant with the addition of the polymerizable oligomer in Examples 1, 3, 4, 7 and 8 of the invention to the liquid crystal display (Curves 1-5 corresponds to Examples 1, 3, 4, 7 and 8, respectively). From the figure, it can be seen that the liquid crystal panels sealed employing the sealants of Examples 1, 3, 4, 7 and 8 of the invention have the liquid crystals with a weak epoxy group characteristic absorption peak intensity of the heat polymerization monomer at 916 cm$^{-1}$ (the FT-IR spectra of Examples 2 and 6 are similar to the FT-IR spectra of Examples 1, 3, 4, 7 and 8 in that the epoxy characteristic absorption peak intensities of the heat polymerization monomer at 916 cm$^{-1}$ are weak; the invention is hereby only illustrated by the FT-IR spectra corresponding to Examples 1, 3, 4, 5, 7 and 8). The aforementioned indicates that sealing the liquid crystal panel with the sealant comprising the polymerizable oligomer of the invention can effectively prevent the unreacted heat polymerization monomer in the sealant from diffusing into the liquid crystal, thereby effectively reducing the contamination of the liquid crystal by the sealant and preventing yellowing and unevenness from occurring to the peripheries of the liquid crystal panel.

The aforementioned are merely exemplary embodiments of the invention, rather than limiting the scope of the invention which is determined by the appended claims.

The invention claimed is:

1. A sealant composition consisting of the following components:
   an ultraviolet polymerizable double bond monomer, 20-30 parts by weight;
   a heat polymerization monomer, 15-20 parts by weight;
   a polymerizable oligomer, 5-20 parts by weight;
   a photoinitiator, 0.1-5 parts by weight;
   a heat curing agent, 10-20 parts by weight; and
   a particulate additive, 0-20 parts by weight;
   wherein said polymerizable oligomer is poly(ethylene glycol) diacrylate or derivatives thereof;
   said photoinitiator is dibenzoyl peroxide, lauroyl peroxide, azobisisobutyronitrile, azobisisoheptonitrile, diisopropyl peroxydicarbonate or dicyclohexyl peroxydicarbonate.

2. The sealant composition according to claim 1, wherein said poly(ethylene glycol) diacrylate or derivatives thereof has a weight-average molecular weight of 200-3000.

3. The sealant composition according to claim 2, wherein said poly(ethylene glycol) diacrylate or derivatives thereof has a weight-average molecular weight of 200-1000.

4. The sealant composition according to claim 1, wherein said ultraviolet polymerizable double bond monomer is an acrylate;
   said heat polymerization monomer is heat polymerizable monomer with epoxy group;
   said heat curing agent is amino curing agent; and
   said particulate additive is a silicon dioxide particle.

5. The sealant composition according to claim 4, wherein said heat polymerizable monomer with epoxy group is ethylene glycol diglycidyl ether; and
   said amino curing agent is 1,8-diamino-3,6-dioxaoctane.

6. The sealant composition according to claim 4, wherein the acrylate is methyl acrylate, methyl methacrylate, ethyl acrylate, propyl acrylate or butyl acrylate.

7. A liquid crystal panel which employs the sealant composition according to claim 1 for sealing.

8. A display device which comprises the liquid crystal panel according to claim 7.

9. A method for preventing liquid crystal contamination using a sealant composition comprising the steps of:
   a) mixing the sealant composition according to claim 1 and subjecting it to defoaming under protection from light;
   b) coating the mixture obtained in step a) onto a colored film substrate and/or an array substrate, and then filling the colored film substrate and the array substrate with liquid crystal and aligning the colored film substrate and the array substrate to obtain a liquid crystal display panel;
   c) irradiating the liquid crystal display panel with ultraviolet light so that the polymerizable oligomer and the polymer of the ultraviolet polymerizable double bond monomer in the sealant are polymerized; and
   d) heating the liquid crystal display panel obtained in step c) so that the heat polymerization monomer in the sealant is polymerized.

10. The method according to claim 9, wherein in the step a), the defoaming under protection from light lasts 1-5 hours.

11. The method according to claim 9, wherein in the step c), the wavelength of the ultraviolet light is 350-380 nm, the duration of the ultraviolet light irradiation is 1-60 minute, and the intensity of the ultraviolet light irradiation is 0.1-100 mW/cm$^2$.

12. The method according to claim 9, wherein in the step d), the temperature of the heat polymerization is 50-150° C., and the reaction duration is 0.5-5 hours.

* * * * *